Sept. 20, 1966  W. W. DOLLISON  3,273,588
FLOW CONTROL VALVE FOR USE IN A WELL TUBING STRING
Original Filed April 4, 1961  3 Sheets-Sheet 2

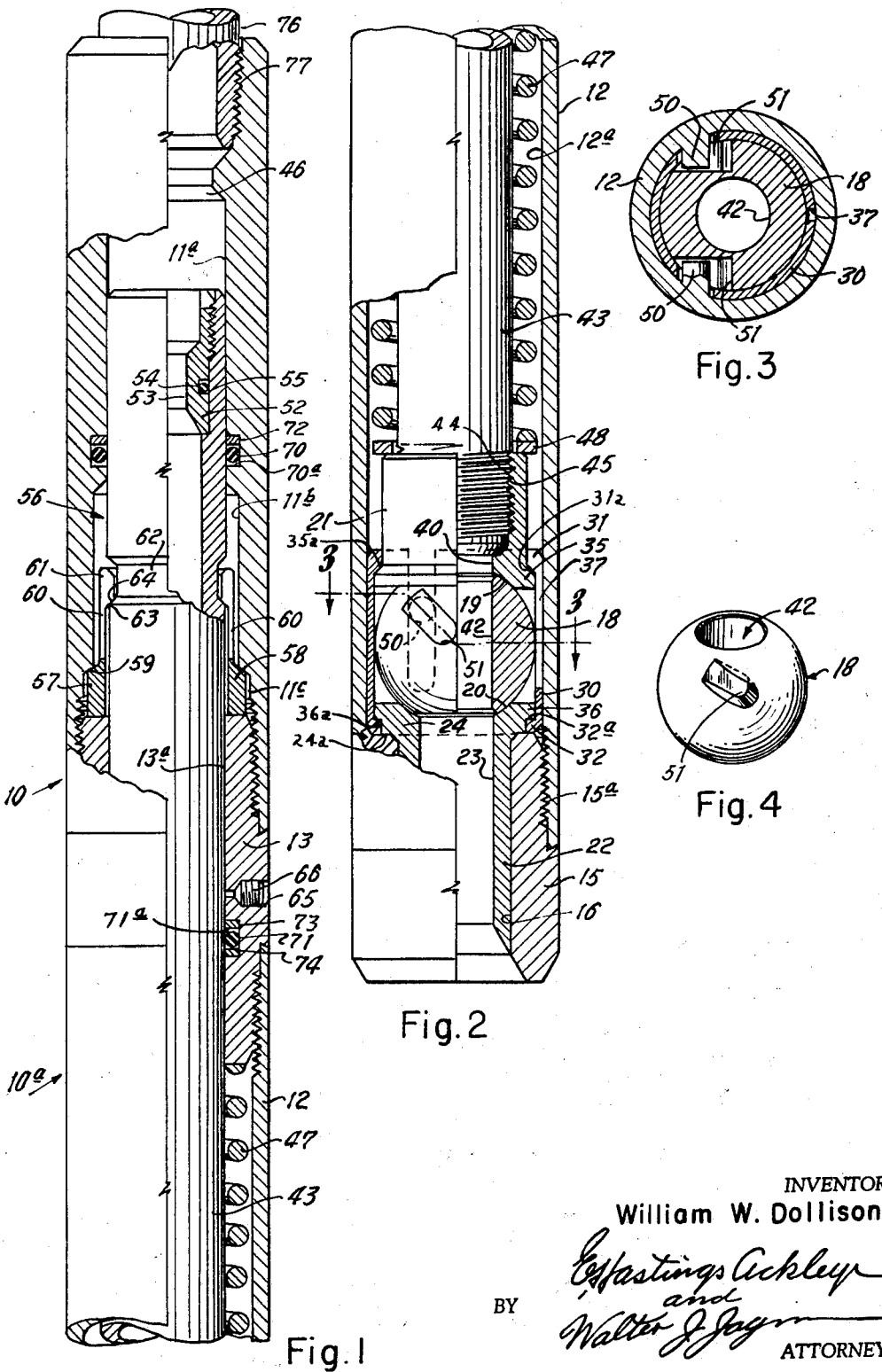

INVENTOR
William W. Dollison
BY *Hastings Ackley
and
Walter J. Jay*
ATTORNEYS

Sept. 20, 1966   W. W. DOLLISON   3,273,588
FLOW CONTROL VALVE FOR USE IN A WELL TUBING STRING
Original Filed April 4, 1961   3 Sheets-Sheet 3

INVENTOR
William W. Dollison

BY

ATTORNEYS

United States Patent Office 3,273,588
Patented Sept. 20, 1966

3,273,588
FLOW CONTROL VALVE FOR USE IN A
WELL TUBING STRING
William W. Dollison, Dallas, Tex., assignor to Otis Engineering Corporation, Dallas, Tex., a corporation of Delaware
Continuation of application Ser. No. 328,157, Nov. 29, 1963, which is a continuation of application Ser. No. 100,667, Apr. 4, 1961. This application Apr. 7, 1965, Ser. No. 448,565
9 Claims. (Cl. 137—460)

This application is a continuation of Serial No. 328,157 filed November 29, 1963, which in turn is a continuation of Serial No. 100,667 filed April 4, 1961, both applications being abandoned.

This invention relates to well tools and more particularly to a flow control device for controlling the flow of fluids through a fluid conductor, such as well tubing.

One object of this invention is to provide a new and improved control device for use in a well flow conductor which is responsive to fluid pressure within the conductor for controlling the flow of fluids therethrough.

Another object is to provide a new and improved valve for a flow conductor wherein the valve is responsive to a predetermined rate of flow of fluid within the conductor for controlling the flow of fluids therethrough.

Still another object is to provide a new and improved pressure responsive device for controlling the flow of fluids through a fluid conductor including a valve mechanism wherein the valve is prevented from assuming any position intermediate its fully-opened and fully-closed positions to preclude erosion or abrading of the valve parts by throttling of the fluid stress or by making its path more tortuous.

A further object is to provide a detent mechanism for a tubing valve adapted to control the flow of fluids through a tubing, or the like, wherein the detent mechanism will hold the valve in fully open position until a force of predetermined magnitude as determined by the flow of fluids through the conductor is exerted upwardly on the valve to release the detent mechanism and move the valve to fully closed position.

A still further object is to provide a detent mechanism for a valve adapted to control the flow of fluids through a tubing, or the like, whereby the detent mechanism will detain the valve in fully open position and resist its being closed by temporary surges of fluid flow through the tubing.

Additional objects and advantages of the invention will be readily apparent from the reading of the following description of a device constructed in accordance with the invention, and with reference to the accompanying drawings thereof; wherein:

FIGURE 1 is a view, partly in elevation and partly in section, of the upper portions of a flow control device embodying the invention, parts of which are broken away, showing it in open position;

FIGURE 2 is a view similar to FIGURE 1, being a continuation thereof, showing the lower portions of the device illustrated in FIGURE 1;

FIGURE 3 is a sectional view taken along the line 3—3 in FIGURE 2;

FIGURE 4 is a perspective view of a ball valve of the flow control device illustrated in FIGURES 1 and 2;

Figures 5, 6:
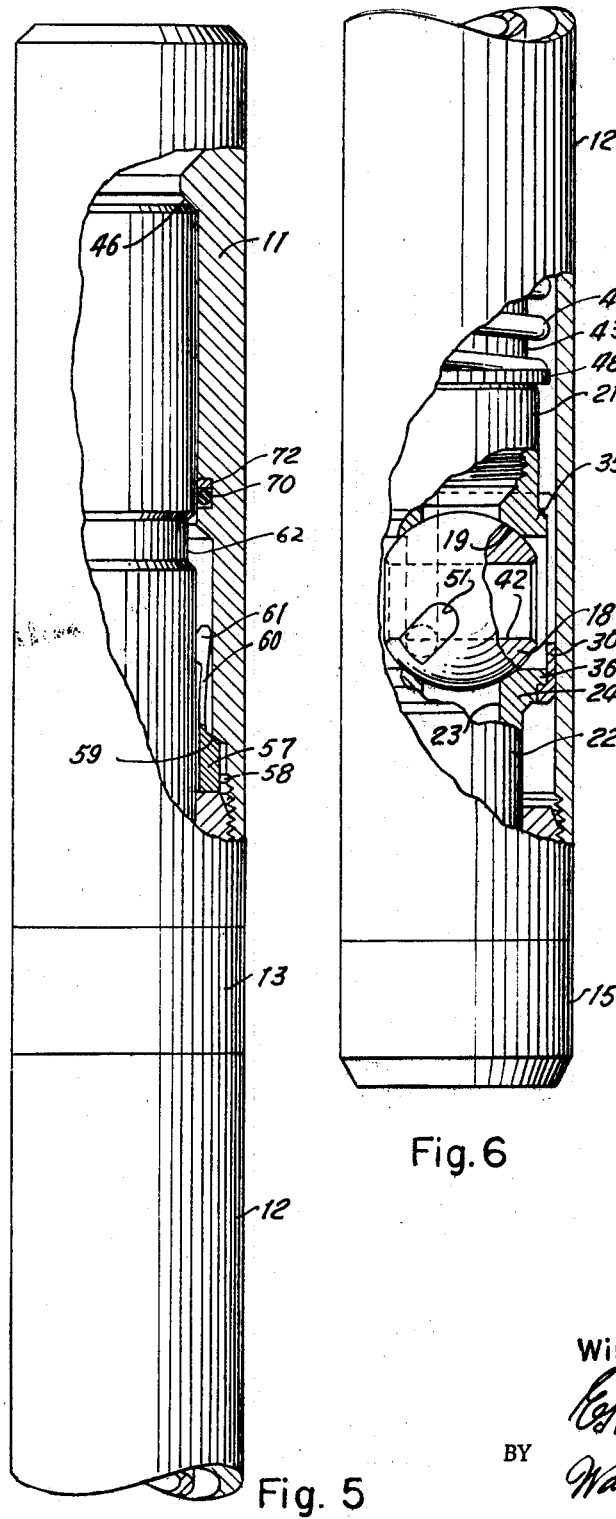
FIGURE 5 is a view, partly in elevation and partly in section, of the upper portions of the flow control device illustrated in FIGURES 1 and 2, showing it in closed position.
FIGURE 6 is a view similar to FIGURE 5, being a continuation thereof, showing the lower portions of the device illustrated in FIGURE 5.
Figure 7:
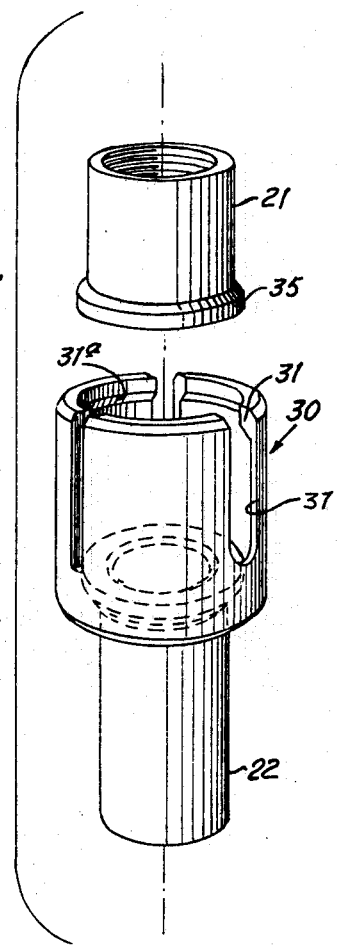
FIGURE 7 is an exploded view in perspective of the valve seats and cage for enclosing the ball valve of the device illustrated in FIGURES 2 and 6.

Referring now particularly to FIGURES 1 and 2, a flow control device 10 embodying the invention includes a housing 10a comprising upper and lower tubular housing members or sections 11 and 12 joined together by means of a tubular connector section 13. The connector is provided with externally threaded end portions which telescope into the internally threaded end portions of the upper and lower sections. The housing also includes a plug 15 which partially closes the lower end of the lower housing section 12 to which it is secured by a threaded connection 15a. The plug has a central bore 16 extending therethrough in alignment with the bores of the other sections of the housing.

A ball valve 18 is disposed within the lower portion of the tubular housing between the seating surfaces 19 and 20 of the upper and lower valve seats 21 and 22, respectively. The lower seat 22 is provided with an axial bore 23 and is slidably disposed in the bore 16 of the plug 15 in axial alignment therewith. Downward movement of the valve seat through the plug is limited by the engagement of the downwardly facing annular shoulder 24a of an external annular flange 24 of the seat with the upper end of the plug.

A cylindrical cage 30 encloses the ball valve 18 and is mounted for sliding movement within the lower end portion of the housing member 12. The cage has inwardly directed annular flanges 31 and 32 at its upper and lower ends, respectively, which form the downwardly and upwardly facing shoulders 31a and 32a. An external flange 35 of the seat 21 at the lower end thereof and an extension 36 of the flange 24 of seat 22 provide upwardly and downwardly facing shoulders 35a and 26a, respectively, which engage the cage shoulders 31a and 32a, respectively, thereby retaining the valve seat members within the cage and their seating surfaces in engagement with the ball valve. The cage is longitudinally split or slotted as at 37 and formed of a resilient metal whereby the upper end portion of the cage may deform resiliently to permit assembly of the valve seats and the ball valve therewith.

The upper valve seat 21 has an axial bore 40 which communicates with the bore of the lower valve seat through a bore 42 of the ball valve when the valve is in the open position shown in FIGURE 2. The upper seat is also provided with a tubular extension 43 connected thereto by means of threads 44 coacting with internal threads 45 formed within an enlargement of the bore 40 of the upper valve seat. The valve seat extension extends slidably through the bore 13a of the connector section 13 of the housing and is slidably received in the bore 11a of the upper housing section. Upward movement of the valve seat extension 43 is limited by engagement of its upper end with the downwardly facing shoulder 46 which is formed in the upper housing section by a restriction of its bore.

A coil spring 47, mounted within the bore 12a of the lower housing section is disposed about the valve seat extension 43. The lower end of the spring abuts the upper end of the valve seat 21 and its upper end abuts the lower end of the connector section 13, thereby biasing the ball valve, the valve seats and the cage downwardly relative to the housing. The biasing force of the spring is adjustable by the interposition of an annular spacer member 48 of desirable thickness between the lower end of the coil spring and the upper end of the valve seat 21. If desired, of course, the spacer 48 could also be placed between the upper end of the spring and the connector section 13.

A pair of pivot pins 50 projecting inwardly from the inner wall of the lower housing 12 extend through longitudinal slots 37 of the valve cage 30 and into the blind slots 51 provided in the exterior of the ball 18, as shown in FIGURE 3. The pins extend co-linearly within the housing along a line which is offset from a diameter therethrough. In the open position of the valve, wherein the valve bore 42 is aligned with the seat bores, the pins are positioned at the upper ends of the slots 51, as the slots appear in FIGURE 2. If the ball is moved upwardly within the housing to the upper position shown in FIGURE 6, the ball pivots about the pins 23 and at the same time rotates substantially 90 degrees about its central axis. In this position, illustrated in FIGURE 6, the ball valve bore is no longer in alignment or in communication with the bores of the valve seats and the ball is in contact with the upper seating surface 19 and the lower seating surface 20 of the valve seats 21 and 22, respectively.

A flow bean 52, having an orifice 53 of a predetermined desired diameter, is threaded into the upper end of the central bore of the valve seat extension 43. An O-ring 54 positioned within an external annular groove 55 of the flow bean provides a fluid-tight seal between the flow bean and the extension. As is well known in the art, the restriction of the passage through the extension 43 by the smaller orifice of the flow bean causes a drop in pressure in the stream of well fluids flowing upwardly therethrough when the valve is in open position, which pressure drop creates an upward force to counteract the downward bias of the spring 41 and tends to move the upper valve seat and the ball valve to upper closed position.

An enlargement 11b of the bore of the upper housing section and a further enlargement 11c at the lower end thereof form an annular chamber 56 between the valve seat extension and the inner wall of the housing section. A collet 57 having an external annular flange 58 is disposed within this annular space with the flange 58 confined between the upper end of the connector section 13 and the downwardly facing shoulder 59 of the upper housing section. The collet is provided with a plurality of circumferentially spaced fingers 60 having internally projecting bosses 61 on their upper ends which, when the upper seat 21 is in its lower position, extend into an annular external groove 62 of the extension 43. In this position, as shown in FIGURE 1, the collet fingers are in their normally contracted position and therefore serve as a detent means for releasably holding the valve seat extension 43, the upper seat 21, the ball valve 18 and valve cage 30 against upward movement in the housing. The collet fingers are effective as a detention means until a force tending to lift the upper seat exceeds the predetermined value necessary to overcome the force of the spring 47 and the collet fingers. The collet fingers are then cammed outwardly by engagement of the sloping and downwardly facing shoulders 63 of the collet bosses with the corresponding upwardly facing annular shoulder 64 defining the lower end of the annular groove 62, and the valve seat extension is thus released for upward movement in the housing.

The annular chamber 56 in which the collet 57 is disposed is filled with oil or other suitable fluid substance which serves as a lubricant and also excludes foreign matter from the chamber. During assembly of the flow control device, an escape port 65 in the connector section 13 allows excess oil in the chamber to escape as the upper housing section 11 is screwed to the connector section. A plug screw 66 is then inserted in the escape port after assembly to prevent leakage from the chamber 56.

On O-ring 70 disposed within an internal groove 70a formed in the wall of the upper housing section bore 11a, and an O-ring 71 disposed within an internal groove 71a in the connector section 13, seal between the valve seat extension 43 and the housing. In addition, the O-rings also seal above and below the oil chamber 56 to prevent the loss or contamination of the oil. A back-up ring 72 in the groove 70a and back-up rings 73 and 74 in the groove 71a prevent extrusion of these O-rings from the grooves.

In use, the device is supported by a mandrel 76, which is locked in a well flow conductor, such as a tubing string, by means of internal threads 77 co-acting with threads on the mandrel. The mandrel 76 is provided with seal means to seal between it and the well flow conductor, so that all flow is directed upwardly through the central passageway of the flow control device. If desired, a conventional pressure equalizing device, such as the Otis equalizing sub illustrated and described on page 4334 of the Composite Catalog of Oilfield and Pipeline Equipment and Services, 1960–61 edition, may be connected between the mandrel 76 and the control device 10, and actuated by a prong lowered into the well on a wire line to admit well fluids from exteriorly of the flow control device through a lateral aperture of such sub and equalize pressure across the valve.

It will thus be seen that the flow of fluids through the restricted orifice 53 of the flow bean 52 produces a drop in pressure across the bean. The resulting differential pressure acts across the area sealed by the O-ring 70 exclusive of the area of the orifice and tends to lift the ball valve and the seats to their upper closed position, but this force is opposed by the force exerted by the spring 47 and force exerted by the collet fingers 60 tending to hold the upper valve seat in its lower position.

When the differential pressure resulting from fluid flow through the flow bean exceeds the predetermined value necessary to overcome the resistance of the coil spring and the collet, the upper seat will be forced suddenly to its uppermost position. The lower seat and ball valve, since they are restrained by the cage 30 to follow the movement of the upper seat, will be moved upwardly with the upper seat. The ball, at the same time, will be pivoted about the pins 50 and rotated about its axis to closed position.

It will further be apparent that as the holding force of the collet is overcome and the collet finger bosses are cammed outwardly of the groove in the valve seat extension, the valve will close quickly once the collet is rendered ineffective to restrain the upper valve seat in its lower position.

It will be apparent that the load or resistance of the spring when the valve is in closed position is greater than when it is in open position. However, this resistance should not exceed the sum of its load in the open position and the load of the collet. For example, if the upper seat moves one inch between its lower and upper positions and the resistance rate of the spring is 150 lbs. per inch, then the spring load would be 150 pounds greater with the valve closed than with the valve open, and the collet should therefore withstand an upward force from the seat extension of at least 150 pounds and preferably a little more.

After the valve has been closed, as shown in FIGURE 4, it will remain in closed position until the pressures above and below it are equalized. This may be accomplished by pressurizing the bore of the flow conductor above the flow control device by introducing fluid pressure from an external source, or if the equalizing device or sub previously mentioned is provided, by lowering a prong on a wire line and opening a by-pass port through the wall of the equalizing device, thereby permitting well fluids to pass therethrough to the mandrel above the ball valve and thus equalize pressures across the valve.

At some point before equalization of the pressures occurs, however, the spring 47 will force the ball and seats to their lower open positions, thereby re-opening the valve and re-engaging the collet fingers in the external groove 62 of the seat extension 43. The valve is then again positioned to permit the production of well fluids therethrough until the rate of flow of such fluids reaches or exceeds a predetermined value; in particular, that rate of flow which will create sufficient differential pressure to overcome the combined biasing force of the spring and the retaining force of the collet, thereby again actuating the valve to its upper closed position.

It will thus be seen that the flow control device described herein is provided with a new and improved detent means or mechanism which permits actuation of the valve to closed position only when a predetermined rate of fluid flow through the device is attained.

It will now readily be seen that the detent means or mechanism disclosed herein prevents the valve from assuming any position intermediate its fully-opened and fully-closed positions and causes the valve to move quickly between its open and closed positions. Thus, the stream of fluids through the device is not pinched or throttled by the valve nor is its path made more tortuous, both of which conditions would cause erosion or abrading of the valve and seat parts.

Figure 8:
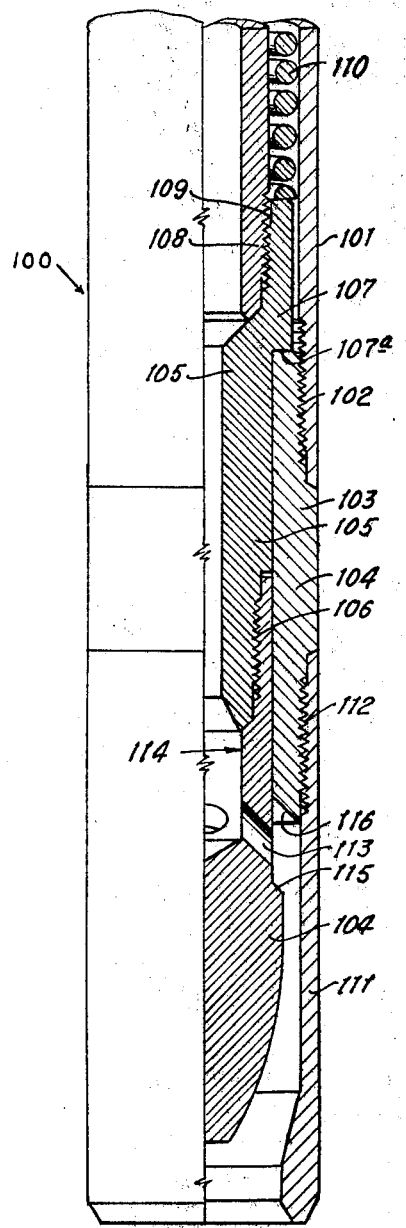
FIGURE 8 is a view, partly in elevation and partly in section, showing the lower portions of a flow control device utilizing a modified form of valve mechanism, which may be employed with the detent mechanism of the present invention.
Figure 9:
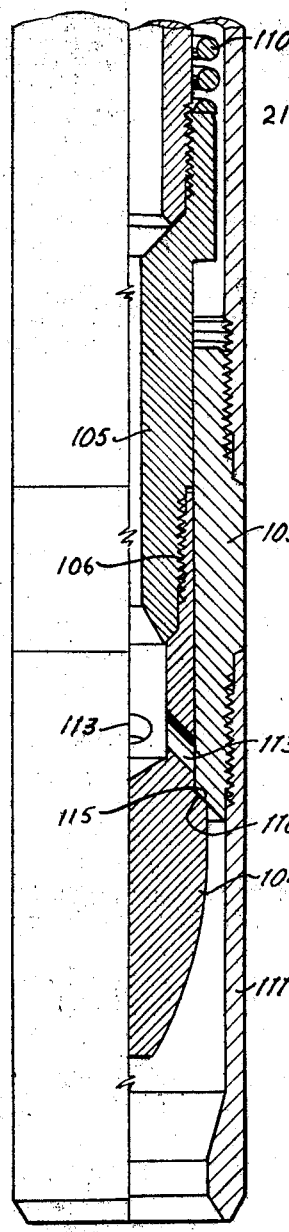
FIGURE 9 is a view similar to FIGURE 8, showing the flow control device in its closed position.

Illustrated in FIGURES 8 and 9 is the lower portion of another form of valve with which the detent mechanism of the present invention may be used. The valve is similar to the Otis Type F Tubing Safety Valve illustrated in the Composite Catalog of Oilfield Equipment and Services, 1959 edition, page 3972, the principal difference being the addition of the detent mechanism (not shown) of the present invention.

The valve 100 includes a tubular housing 101 to the lower end of which is secured, by means of the threads 102, a tubular valve seat 103. Slidably disposed within the valve seat are a valve 104 and flow bean 105 secured to one another by threads 106. The flow bean has an enlarged portion 107 at its upper end providing a downwardly facing shoulder 107a which abuts the upper end of the valve seat to limit downward movement of the valve when the valve is in its lowermost open position illustrated in FIGURE 8. A bean extension 108, which is secured by threads 109 to the upper end of the flow bean, extends upwardly in the housing, and is substantially identical to the valve seat extension 43 of the device illustrated in FIGURE 1. A coil spring 110 disposed in encircling relation about the bean extension 108 with its lower end abutting the upper end of the flow bean provides a downward bias tending to hold the valve in its lower open position. Together with the spring, a collet (not shown) having collet fingers and bosses disposed in an external groove of the bean extension serves to hold the valve in its lower open position against the upwardly acting force of the differential pressure created by the flow of well fluids through the flow bean. The arrangement within the housing of the collet or detent mechanism relative to the bean extension may be substantially identical with that illustrated in FIGURE 1.

When the valve is in open position, well fluids enter the central bore of the skirt 111, secured to the lower end of the valve seat by threads 112, and flow around the valve 104, passing through lateral inclined apertures 113 of the valve and then through the passage formed by the valve bore 114 and the restricted passage of the bean 105 into the bean extension 108.

As with the flow control device illustrated in FIGURES 1 and 2, when the rate of flow creates sufficient differential across the flow bean, the combined detaining force of the collet and spring will be overcome and the valve is moved rapidly upwardly to its closed position. As shown in FIGURE 9, when the valve 104 is in closed position, the upwardly facing inclined shoulder or seat 115 of the valve sealingly engages the downwardly facing inclined shoulder or seat 116 of the valve seat and all flow through the device ceases.

Reopening of the valve may be accomplished in the same manner described for reopening of the device in FIGURES 1 and 2.

Figure 10:
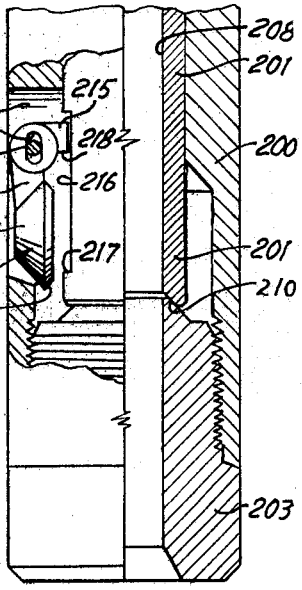
FIGURE 10 is a view, partly in section and partly in elevation, of the lower portion of a flow control device employing a flapper type valve, and which may be equipped with the detent mechanism of this invention; and, FIGURE 11 is a view similar to FIGURE 10, showing the flapper valve in closed position.
Figure 11:
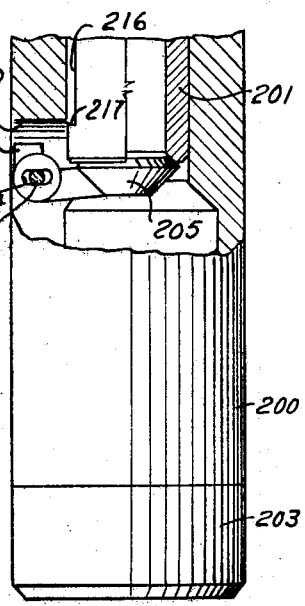

Illustrated in FIGURES 10 and 11 is the lower portion of still another valve with which the detent mechanism embodying the present invention may be used. The valve is a flapper-type valve, similar to the one described and illustrated in U.S. patent application, Serial No. 772,130, filed November 5, 1958, now Patent No. 3,071,151, assigned to the same assignee as this application.

The valve includes a tubular housing sleeve 200 having a central bore in which is slidably disposed a valve seat element 201. The valve seat element is held in its lower open position, as shown in FIGURE 10, by the fluid pressure in an annular chamber (not shown) provided between the valve seat and the housing sleeve 200. A spring (not shown) also provides a downward biasing force tending to move and hold the valve seat in its lower closed position. The spring as well as the details of the chamber are disclosed in detail in the co-pending application, Serial No. 772,130, referred to above. Thus, the valve reacts to the pressure within the bore of the valve seat 201 and does not require an orifice for creating a pressure drop and a resulting pressure differential for moving the valve upwardly.

In any case, however, when the valve seat 201 moves upwardly, a flapper-type valve 205 having a beveled seal surface 206 is pivoted upwardly into engagement with the lower end of the valve seat to close the bore 208 of the valve seat 201 by the engagement of the annular surface 206 with the seat surface 210 of the valve seat. The flapper valve is disposed in a lateral longitudinal slot 211 formed in the wall of the sleeve 200, and is retained therein by a shaft or pin 212 which extends through a slot 212a in the integral arm 213 of the body 207 of the flapper valve 205 into aligned slots (not shown) in the sleeve which extend outwardly from the slot 211.

The arm 213 is also provided with a bell crank or lever lug 215 which extends at a right angle with respect to the arm, projecting inwardly as shown in FIGURE 10.

The outer end of the lug extends into an external recess 216 in the lower end of the valve seat 201. The external recess 216 provides an annular upwardly facing trip shoulder 217 which is adapted to engage the downwardly facing shoulder 218 of the lever lug to pivot the flapper valve 205 in an upwardly swinging manner when the valve element 201 is moved upwardly.

In this type of flow control device, the valve seat 201, like the upper seat extension 43 of the tubing valve disclosed in FIGURE 1, and the bean extension of the flow control service disclosed in FIGURES 8 and 9, must move from a lower, open position, to an upper, closed position; and like these tubular extensions in the other flow control devices may be provided with an external annular groove in which the fingers of a collet engage for holding the valve seat in lower open position until sufficient upward force is exerted on the extension.

It will thus be seen that a flow control device for a flow conductor has been illustrated and described which remains in fully open position until a predetermined rate of fluid flow through the conductor is exceeded and which will then move with a sudden or snap action to fully closed position.

It will further be seen that flow control device for a flow conductor is disclosed herein which is held in fully open position by a detent means, which detent means is releasable in response to a predetermined rate of fluid flow through said flow conductor.

The foregoing description of the invention is explanatory only and changes in the details of the construction illustrated may be made by those skilled in the art, within the scope of the appended claims, without departing from the spirit of the invention.

What is claimed and desired to be secured by Letters Patent is:

1. A well flow control device for use in a well tubing string including: an elongate housing having a bore extending therethrough; means for connecting said housing in a well tubing string with the bore of said housing in alignment with the bore of said tubing string; a valve element having a passage extending longitudinally therethrough and mounted for movement longitudinally within said housing between a first position and a second position; seal means between said valve element and said tubular housing for sealing between said valve element and said housing whereby fluid flowing through said housing may pass only through said valve element passage; valve means mounted within said housing and operatively associated with said valve element for opening and closing said passage in accordance with the movement of said valve element, said valve means opening said passage when said valve element is in said first position, said valve means closing said passage when said valve element is in said second position; resilient means in said housing disposed about said valve element and engaging said housing and said valve element and biasing said valve element to said first position wherein said passage is open; a collet disposed about said valve element and mounted in fixed position relative to said housing; recess means on the exterior of said valve element, said collet having yieldable latch means engageable with said recess means on the exterior surface of said valve element with a force supplementing the force exerted on said valve element by said biasing means for releasably holding said valve element in said first position wherein said passage is open; and means restricting said passage of said valve element whereby a predetermined rate of fluid flow through said passage produces a differential pressure acting on said valve element with a force in excess of the force with which said biasing means and said yieldable latch means of said collet sleeve restrains said valve element in said first position to release said latch means and move said valve element from said first position to said second position with a sudden snap action, thereby operating said valve means for closing said passage.

2. The device of claim 1 wherein the valve means comprises a ball having a bore extending therethrough and pivotally mounted within said housing, said ball being positioned with its bore in communication with the passage through said valve element when said valve element is in said first position, said ball being positioned with its exterior surface in sealing engagement with said valve element and in blocking relation to said passage to close said passage when said valve element is in said second position.

3. The device of claim 1 wherein the valve means comprises a lateral port in said valve element which is open when said valve element is in said first position and is closed by said housing when said valve element is in said second position.

4. The device of claim 1 wherein the valve means comprises a valve member pivotally mounted on said housing and movable into engagement with said valve element to close said passage upon movement of said valve element to said second position.

5. A well flow control device including: an elongate housing having a bore extending longitudinally therethrough; a valve element having a passageway extending longitudinally therethrough and slidably mounted within said housing for movement therein; seal means for sealing between said valve element and said housing whereby fluid flowing through said housing may pass only through said valve element passage; means within said housing for limiting the movement of said valve element between a first position and a second position; valve means mounted within said housing and operatively associated with said valve element for opening and closing said passageway in accordance with the movement of said valve element, said valve means opening said passageway when said valve element is in said first position, said valve means closing said passageway when said valve element is in said second position; a helical spring surrounding said valve element and engaging said housing and said valve element and biasing said valve element to said first position; collet sleeve means mounted within said housing and having inwardly projecting bosses thereon biased into engagement with said valve element; external recess means on said valve element engageable with said bosses of said collet sleeve means only when said valve element is in said first position; said bosses engaging said recess means of said valve element and holding the same against movement in said housing with a force in addition to the force exerted on said valve element by said spring biasing means for releasably holding said valve element in said first position wherein said bore is open; and means operatively associated with said valve element and responsive to fluid pressure within said passageway creating a force in excess of the combined forces of said spring biasing means and said collet bosses and acting on said valve element in opposition to said combined forces to release said bosses of said collet sleeve means from holding engagement with said valve element and to move said valve element from said first position to said second position with a sudden snap action against the force of said biasing means, thereby operating said valve means to position closing said passageway.

6. A well flow control device for use in a well tubing string including: an elongate housing having a bore extending therethrough; means for connecting said housing in a well tubing string with the bore of said housing in alignment with the bore of said tubing string; a tubular valve element having a passage extending longitudinally therethrough and mounted for movement longitudinally within said housing between a first position and a second position; a pair of longitudinally spaced seal means between said valve element and said tubular housing for sealing between said valve element and said housing whereby fluid flowing through said housing may pass only through said valve element passage; valve means mounted within said housing and operatively associated with said valve element for opening and closing said passage of said valve element in accordance with the movement of said valve element, said valve means opening said passage when said valve element is in said first position, said valve means engaging said valve element for closing said passage when said valve element is in said second position; resilient means in said housing disposed about said valve element and engaging said housing and said valve element and biasing said valve element to said first position wherein said passage is open, said housing defining an annular fluid filled chamber between said pair of seal means; a collet in said annular chamber disposed about said valve element and mounted in fixed position relative to said housing; recess means on the exterior of said valve element located between said pair of seal means, said collet having yieldable latch means engageable with said recess means on the exterior surface of said valve element with a force acting complementary to said biasing means to resist movement of said valve element from said first position to said second position and adapted to hold said valve element in said first position until a fluid pressure differential is applied to said valve element in excess of the combined force of said holding means and said biasing means for releasing said valve element for movement from said first position wherein said passage is open; and means operatively associated with said valve element and responsive to fluid flow through said passage of said valve element to create a pressure differential force across said valve element in excess of the force applied to said valve element by said holding means and said biasing means to release said latch means and move said valve element from said first position to said second position with a sudden snap action against the force of said biasing means, thereby positioning said valve means for closing said passage.

7. The device of claim 6 wherein the valve means comprises a ball having a bore extending therethrough and pivotally mounted in engagement with said valve element and movable therewith within said housing, said ball being positioned with its bore in communication with the passage through said valve element when said valve element is in said first position, said ball being positioned with its exterior surface in sealing engagement with said valve element and in blocking relation to said passage to close said passage when said valve element is in said second position.

8. The device of claim 6 wherein the valve means comprises a valve member pivotally mounted on said housing and movable into engagement with said valve element to close said passage of said valve element upon movement of said valve element to said second position.

9. A well flow control device including: an elongate housing having a bore extending longitudinally therethrough; a tubular valve element slidably mounted for limited longitudinal movement within said housing between a lower position and an upper position; valve means mounted within said housing and operatively associated with said valve element for opening and closing said bore in accordance with the movement of said valve element, said valve means opening said bore when said valve element is in said lower position; said valve means closing said bore when said valve element is in said upper position; means in said housing acting on said valve element for biasing said valve element to said first position wherein said bore is open; external recess means on said valve element; a collet sleeve mounted within said housing and having inwardly projecting bosses thereon engaging said recess means of said valve element with a predetermined force in combination with said biasing means for releasably holding said valve element in said lower position wherein said bore is open; and means operatively associated with said valve element and responsive to fluid pressure within said bore acting on said valve element to create a pressure differential across said valve element acting thereon in opposition to the combined forces of said biasing means and said collet bosses with a force in excess of the force of said biasing means and the force with which said bosses engage the recess means of said valve element to release said bosses of said collet sleeve from holding engagement with said external recess means of said movable element to free said valve element for movement against the force of said biasing means from said lower position to said upper position wherein said valve means closes said bore of said movable valve element.

References Cited by the Examiner

UNITED STATES PATENTS

| | | | |
|---|---|---|---|
| 2,373,034 | 4/1945 | Laird et al. | 137—498 X |
| 2,651,319 | 9/1953 | Cummings | 137—155 |
| 3,070,119 | 12/1962 | Raulins | 137—460 |
| 3,071,151 | 1/1963 | Sizer | 137—496 |
| 3,094,308 | 6/1963 | Conrad | 251—297 |
| 3,126,908 | 3/1964 | Dickens | 137—460 |

M. CARY NELSON, *Primary Examiner.*

MARTIN P. SCHWADRON, *Examiner.*